United States Patent
Mappus et al.

(10) Patent No.: US 10,210,723 B2
(45) Date of Patent: Feb. 19, 2019

(54) WEARABLE ULTRASONIC SENSORS WITH HAPTIC SIGNALING FOR BLINDSIDE RISK DETECTION AND NOTIFICATION

(71) Applicants: AT&T Intellectual Property I, L.P., Atlanta, GA (US); AT&T Mobility II LLC, Atlanta, GA (US)

(72) Inventors: Rudolph Mappus, Plano, TX (US); Surekha Padala, Houston, TX (US); Chad Blackwell, Dacula, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 137 days.

(21) Appl. No.: 15/295,403

(22) Filed: Oct. 17, 2016

(65) Prior Publication Data

US 2018/0108225 A1 Apr. 19, 2018

(51) Int. Cl.
*G01S 15/00* (2006.01)
*G08B 6/00* (2006.01)
*G01S 15/88* (2006.01)
*G01S 15/93* (2006.01)
*G01S 1/72* (2006.01)
(Continued)

(52) U.S. Cl.
CPC ............ *G08B 6/00* (2013.01); *G01S 1/725* (2013.01); *G01S 15/10* (2013.01); *G01S 15/87* (2013.01); *G01S 15/88* (2013.01); *G01S 15/93* (2013.01)

(58) Field of Classification Search
CPC . G08B 6/00; G01S 15/88; G01S 15/08; G01S 15/582
See application file for complete search history.

(56) References Cited

U.S. PATENT DOCUMENTS

| | | | |
|---|---|---|---|
| 5,515,853 A | * | 5/1996 | Smith .................. A61B 5/0422 128/916 |
| 6,671,226 B1 | | 12/2003 | Finkel et al. |
| 6,671,618 B2 | | 12/2003 | Hoisko |

(Continued)

FOREIGN PATENT DOCUMENTS

WO WO 2015/083183 6/2015

OTHER PUBLICATIONS

Spelmezan, Daniel, et al. "Tactile motion instructions for physical activities." Proceedings of the SIGCHI Conference on Human Factors in Computing Systems. ACM, 2009. https://hci.rwth-aachen.de/materials/publications/spelmezan2009b.pdf.

(Continued)

*Primary Examiner* — Hovhannes Baghdasaryan

(57) ABSTRACT

Devices, non-transitory computer-readable media and methods for providing a haptic signal based upon a detection of an object are disclosed. For example, the processor of a device may transmit a first ultrasonic signal via an ultrasonic emitter and detect an object based upon a receiving of a reflected signal via an ultrasonic detector, where the reflected signal comprises a reflection of the first ultrasonic signal from the object. The processor may further monitor for a second ultrasonic signal via the ultrasonic detector. The device may be associated with a user, and the second ultrasonic signal may be associated with a teammate of the user. The processor may also select whether to provide an instruction to a haptic actuator when the object is detected, based upon whether the second ultrasonic signal is received via the ultrasonic detector.

20 Claims, 5 Drawing Sheets

(51) Int. Cl.
*G01S 15/10* (2006.01)
*G01S 15/87* (2006.01)

(56) References Cited

U.S. PATENT DOCUMENTS

| | | | |
|---|---|---|---|
| 7,908,060 | B2 | 3/2011 | Basson et al. |
| 7,957,901 | B2 | 6/2011 | Shin et al. |
| 8,093,995 | B2 | 1/2012 | Steger et al. |
| 8,172,722 | B2 | 5/2012 | Molyneux et al. |
| 8,523,740 | B2 | 9/2013 | Kruse et al. |
| 9,126,525 | B2 | 9/2015 | Lynam et al. |
| 9,248,343 | B2 | 2/2016 | Molyneux et al. |
| 9,257,054 | B2 | 2/2016 | Coza et al. |
| 9,282,893 | B2 | 3/2016 | Longinotti-Buitoni et al. |
| 9,384,645 | B1 | 7/2016 | Allen et al. |
| 9,958,943 | B2 * | 5/2018 | Long .................. G06F 3/016 |
| 2008/0085686 | A1 | 4/2008 | Kalik |
| 2008/0120029 | A1 | 5/2008 | Zelek et al. |
| 2013/0066448 | A1 | 3/2013 | Alonso |
| 2013/0169425 | A1 | 7/2013 | Victor et al. |
| 2014/0184384 | A1 * | 7/2014 | Zhu .................. G09B 21/003 340/4.12 |
| 2014/0266571 | A1 | 9/2014 | Sharma et al. |
| 2014/0293747 | A1 * | 10/2014 | Calvarese .......... G01S 7/52004 367/95 |
| 2015/0070129 | A1 | 3/2015 | Moore et al. |
| 2015/0149837 | A1 | 5/2015 | Alonso et al. |
| 2015/0294597 | A1 | 10/2015 | Rizzo |
| 2016/0104380 | A1 | 4/2016 | Maiolani et al. |
| 2016/0127698 | A1 | 5/2016 | Mali et al. |
| 2016/0144915 | A1 | 5/2016 | Bejestan et al. |
| 2016/0171846 | A1 | 6/2016 | Brav et al. |

OTHER PUBLICATIONS

Zahid, Ali. "Vanhawks Valour | First ever connected carbon fibre bicycle." KickStarter, kickstarter.com, Funded: May 31, 2014. https://www.kickstarter.com/projects/1931822269/vanhawks-valour-first-ever-connected-carbon-fibre/description.

"Accessibility First: The evolution of the revolution." Ducere Technologies, lechal.com, accessed: Sep. 2016. http://www.lechal.com/accessibility.html.

Hoefer, Steve. "Meet the Tacit Project. It's Sonar for the Blind." Grathio Labs, grathio.com, Aug. 8, 2011. http://grathio.com/2011/08/meet-the-tacit-project-its-sonar-for-the-blind.

Velázquez, Ramiro. "Wearable assistive devices for the blind." Wearable and autonomous biomedical devices and systems for smart environment. Springer Berlin Heidelberg, 2010.331-349. https://www.researchgate.net/profile/Ramiro_Velazquez2/publication/226785713_Wearable_Assistive_Devices_for_the_Blind/links/53d12e920cf228d363e5abd3.pdf.

Shull, Pete B., Wisit Jirattigalachote, and Xiangyang Zhu. "An overview of wearable sensing and wearable feedback for gait retraining." International Conference on Intelligent Robotics and Applications. Springer Berlin Heidelberg, 2013. http://www.wearablesystems.org/s/Shull2013_conf.pdf.

* cited by examiner

WEARABLE ULTRASONIC SENSORS WITH HAPTIC SIGNALING FOR BLINDSIDE RISK DETECTION AND NOTIFICATION

The present disclosure relates generally to device-assisted risk detection, e.g., within a team sporting context, and more particular to devices, computer-readable media, and methods for providing a haptic signal based upon a detection of an object.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In many sporting events, such as in running or cycling, a participant may want to know where other competitors are in relation to the participant at various times during the event. If the participant is in front of other competitors, the participant may simply turn his or her head to see who else is around. However, this may lead to a loss in speed or proper form as the posture of the participant may be affected. In addition, there may be an increase in collision risk. For example, in a tight pack, if the participant glances behind his or her left shoulder, the participant may miss an impending collision with another competitor who is adjacent to or behind the participant's right side.

The present disclosure broadly discloses methods, computer-readable media, and devices for providing a haptic signal based upon a detection of an object. In many sports environments, it may be advantageous for participants to be able to detect oncoming obstacles and other participants from outside their visual fields. In one example, the present disclosure comprises a wearable device having an array of sensor units, the sensor units comprising ultrasonic emitters and ultrasonic detectors integrated with haptic actuators. In one example, the sensor units detect objects and the distances to such objects, and provide a user with tactile information of oncoming objects on the user's blindside via haptic signals from the haptic actuators.

In one example, multiple teammates/players on a sports team may have front-side ultrasonic emitters, such that for a given player, if that player's wearable unit detects an object and also detects emissions indicative that the object is a teammate, that object may be excluded from the providing of the haptic signaling via the player's wearable unit. Emissions from teammates' wearable units can therefore be used to rule out certain detected objects from further calculations regarding distance and direction, and the providing of the haptic signaling.

To illustrate, in the cycling context, a lead cyclist may have a wearable unit to detect objects from behind, e.g., other cyclists, and may be warned of an overtaking cyclist. However, in a team event, the other cyclists approaching from behind may be a teammate and therefore may be purposefully excluded from haptic signaling, or a different haptic signaling can be provided, such as a different pattern of a haptic signaling as compared to a haptic signaling to indicate a detected object that is not a teammate. The lead cyclist may then better determine whether the approaching object, e.g., another cyclist, is a teammate or a competitor. For instance, if the haptic signaling indicates that the approaching object is a competitor, the lead cyclist may choose to pedal harder to maintain the lead, for example. These and other aspects of the present disclosure are discussed in greater detail below in connection with the examples of FIGS. 1-5.

Figure 1:
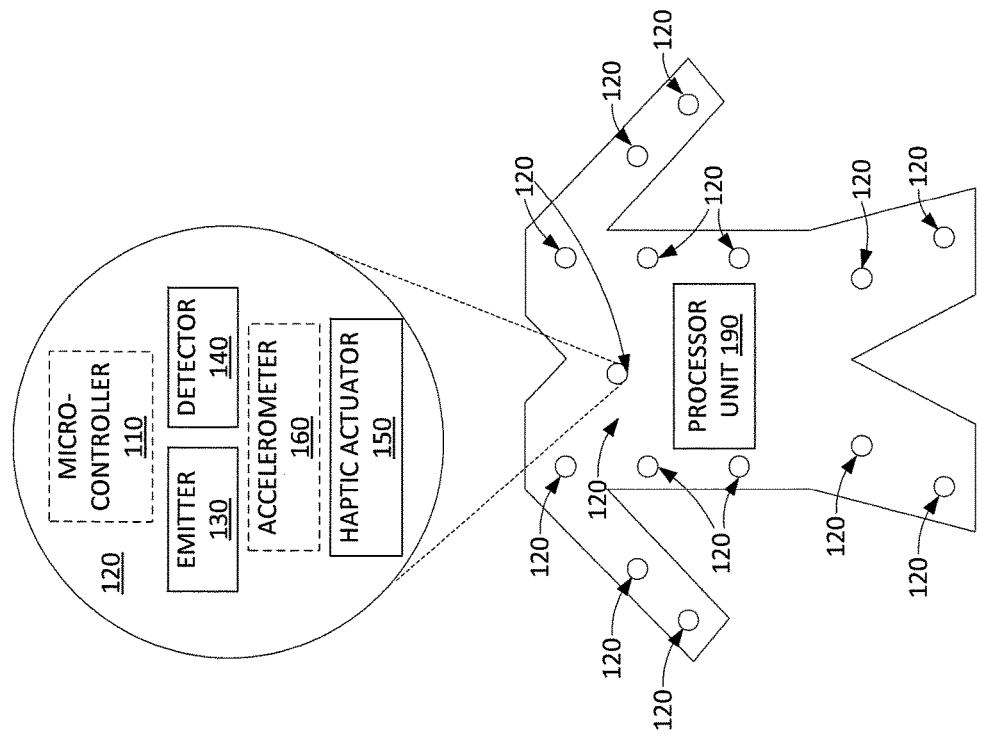
FIG. 1 illustrates an example wearable device with a plurality of sensor units, in accordance with the present disclosure.

FIG. 1 illustrates an example wearable unit 100, e.g., a device, in accordance with the present disclosure. As illustrated in FIG. 1, the wearable unit 100 may comprise a suit or uniform that is wearable by a user and which has a plurality of sensor units 120 deployed thereon. However, in other examples, a wearable unit may take a different form, such as a helmet, a vest, a shirt, a pair of pants or shorts, etc. The sensor units 120 may have various orientations such that each of the sensor units 120 may be pointed in a different direction. However, it should be noted that examples of the present disclosure are directed to blindside risk detection. Accordingly, the sensor units 120 are primarily deployed with orientations towards the back of a user. In one example, each of the sensor units 120 includes an ultrasonic emitter 130, an ultrasonic detector 140, and a haptic actuator 150. In one example, each of the sensor units 120 may also include a microcontroller 110 and/or an accelerometer 160.

In one example, the ultrasonic emitter 130 may generate a directional ultrasonic wave, e.g., a wave that is focused in a given direction, with side lobes having lesser intensities as compared to the direction of focus. For example, the ultrasonic emitter may comprise an acoustic array, such as a parametric array which may be comprised of capacitive ultrasonic transducers, piezo-electric/piezo-resistive ultrasonic transducers, or the like. In one example, the ultrasonic detector 140 may comprise the same or similar components as the ultrasonic emitter 130. For instance, the same or similar components may be used for converting electrical signals into transmitted ultrasonic acoustic signals and for receiving ultrasonic acoustic signals and converting into electrical signals.

In one example, the haptic actuator 150 may comprise a haptic signal generator, such as an eccentric rotating mass (ERM) motor, a linear resonant actuator (LRA), a piezo-haptic actuator, and so forth. In one example, the haptic actuator 150 may comprise a plurality of one or more individual haptic signal generators. As illustrated in FIG. 1, each of the sensor units 120 may further include a microcontroller 110 configured to perform various operations for providing a haptic signal based upon a detection of an object, as described herein. For example, the microcontroller 110 may transmit a first ultrasonic signal via ultrasonic emitter 130 and receive a reflected signal via ultrasonic detector 140, e.g., where the reflected signal comprises a reflection of the first ultrasonic signal from an object. The microcontroller 110 may further monitor for a second ultrasonic signal via the ultrasonic detector 140. For example, the second ultrasonic signal may be associated with a teammate of a user of the wearable unit 100. The microcontroller 110 may also select whether to provide an instruction to haptic actuator 150 when the object is detected, based upon whether the second ultrasonic signal is received via the ultrasonic detector 140.

In addition, it should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

As further illustrated in FIG. 1, the wearable unit 100 may also include a processor unit 190 that may be connected to the plurality of the sensor units 120. For instance, in one example, the processor unit 190 may be configured to perform all or a portion of the functions of microcontroller 110 described above with respect to any one or more of sensor units 120. Thus, in one example, microcontroller 110 may be omitted from one or more of the sensor units 120. In one example, the processor unit 190 may comprise all or a portion of a computing device or system, such as system 500, and/or processor 502 as described in connection with FIG. 5 below.

In one example, the wearable unit 100 may include or may be in communication with a speed sensor (not shown). In one example, the speed sensor may comprise a global positioning system (GPS) unit. In another example, the speed sensor may comprise a tachometer. For example, the wearable unit 100 may be worn by a cyclist, e.g., during a race, with a tachometer deployed on a wheel of a bicycle. In one example, the processor unit 190 may include at least one transceiver for communicating with the tachometer and/or the GPS unit. For instance, the transceiver may comprise a wireless transceiver for Institute of Electrical and Electronics Engineers (IEEE) 802.11 based communications (e.g., "Wi-Fi"), IEEE 802.15 based communications (e.g., "Bluetooth", "ZigBee", etc.), or the like, where the tachometer may be similarly equipped. Alternatively, or in addition, the processor unit 190 may connect to the tachometer and/or the GPS unit via one or more wired connections, such as via a universal serial bus (USB) cable, a peripheral component interconnect express (PCIe) link, or the like.

In one example, the processor unit 190 may determine a speed of the wearable unit 100 (and hence a speed of the user, a bicycle of the user, etc.) based upon measurements from the speed sensor. In one example, the processor unit 190 may then apply corrections to the reflected ultrasonic signal(s) received via the ultrasonic detector 140 of one or more of the sensor units 120 for a Doppler shift based upon the speed that is determined. In another example, the measurements from the speed sensor may be provided to a microcontroller 110 of one of the sensor units 120, where the microcontroller 110 may perform the same calculations and apply the corrections. For example, the microcontroller 110 may communicate with the speed sensor via a wireless or wired connection in the same or a similar manner as described above in connection with processor unit 190. Alternatively, or in addition, the microcontroller 110 may receive the measurements from the speed sensor via the processor unit 190.

In addition, in one example, each of the sensor units 120 may include an accelerometer 160. Accelerometer 160 may be used, for example, to determine velocity changes of individual sensor units 120, e.g., in relation to an average velocity of the user, bicycle, and/or the wearable unit 100 as a whole. The readings from accelerometer 160 may therefore be used to provide a further correction to a reflected signal received via the ultrasonic detector 140 of the associated sensor unit 120. It should also be noted that in one example, the wearable unit 100 may include a forward-facing emitter (not shown) that may emit an ultrasonic signal in front of the user.

In one example, when an object is detected via an ultrasonic detector 140 of one of the sensor units 120, a haptic signal may be generated (e.g., by processor unit 190 and/or microcontroller 110) via the haptic actuator 150 of the one of the sensor units 120. In one example, haptic signals may be specifically disabled for detections of objects that are determined to be teammates of a user of the wearable unit 100. For example, as described in greater detail below, an object may be determined to be a teammate when a second ultrasonic signal associated with the teammate is received by a same ultrasonic detector 140 via which the object is detected. However, in another example, haptic signals having different patterns may be used to distinguish between detected objects that are determined to be teammates of the user and those objects that are not. For example, steady "on-off" pulses may be used for a haptic signal to indicate a detected object that is not determined to be a teammate of the user. However, alternating short and long pulses may be used to identify a detected object that is determined to be a teammate of the user and so on.

In one example, when an object is detected via one of the sensor units 120, a haptic signal may be provided via the same one of the sensor units 120, where the haptic signal corresponds to the object that is detected. For instance, in one example, a pattern of the haptic signal may be based upon a distance to the object that is determined (e.g., determining a distance to a detected object is described above). For example, the haptic signal may comprise a sequence of pulses, where a time between pulses may be shorter, the closer the detected object, and may be longer, the further away the detected object. In another example, the intensity of the haptic signal, e.g., an amplitude and/or a force of a pulse generated by the haptic actuator may be increased when the objected is detected at a closer distance, as compared to when the object is detected further away. Thus, the intensity and/or the periodicity of the haptic signals may be varied to provide information regarding distances and/or to distinguish teammates from non-teammates. These and other aspects of the present disclosure are described in greater detail below in connection with the example of FIG. 2.

It should be noted that variations of the above wearable unit 100 may also be implemented in accordance with the present disclosure. For example, wearable unit 100 includes sensor units each with an integrated ultrasonic emitter, ultrasonic detector, and haptic actuator. However, in another example, a wearable unit may have less than a one-to-one correspondence between ultrasonic emitter/detector pairs and haptic actuators. For instance, a different wearable unit may have one haptic actuator for every three ultrasonic emitter/detector pairs. In one example, emitter/detector pairs and haptic actuators may be decoupled. In other words, these components may not be affixed to one another within the sensor units, but may comprise stand-along components that may be coordinated via the centralized processor unit 190. Thus, additional changes of a same or a similar nature may be implemented in various wearable units in accordance with the present disclosure.

Figure 2:
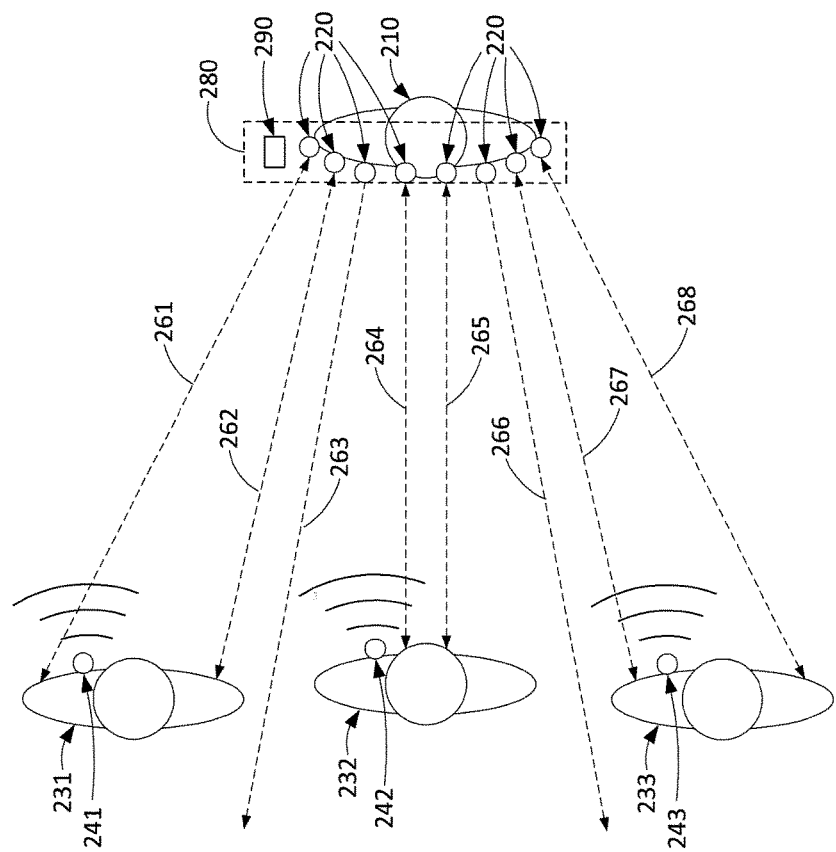
FIG. 2 illustrates an example of using a wearable device to detect objects behind a user, in accordance with the present disclosure.

FIG. 2 illustrates an example system 200 for a wearable unit 280 to detect objects (e.g., teammates or other participants) behind a user, in accordance with the present disclosure. As illustrated in FIG. 2, there may be several users 210, 231, 232, and 233 who are engaged in an event, e.g., a sporting event, such as a running race, a cycling race, a football game, and so forth. As further illustrated in FIG. 2, user 210 may be wearing a wearable unit 280 comprising a plurality of sensor units 220 and a processor unit 290. In one example, each sensor unit 220 may include an ultrasonic emitter, an ultrasonic detector, and a haptic actuator (not shown). In one example, each sensor unit 220 may have a same or a similar form as sensor units 120 in FIG. 1. In addition, processor unit 290 may comprise the same or a similar component as processing unit 190 in FIG. 1.

In one example, the sensor units 220 may be arranged, e.g., in an array, and may have different orientations such that various directions behind the user 210 are covered. To illustrate, a first one of the sensor units 220 may emit an ultrasonic acoustic signal via an ultrasonic emitter in the direction indicated by line 261. In addition, as illustrated in FIG. 2, the ultrasonic acoustic signal may encounter user 231 and a reflected acoustic signal may be propagated from user 231 back to the first one of the sensors unit 220 along the direction of line 261, where the reflected acoustic signal may be received by the ultrasonic detector of the first one of the sensor units 220. Other sensor units 220 may emit ultrasonic signals and receive reflected ultrasonic signals, e.g., along the directions of lines 262, 264, 265, 267 and 268. For instance, the ultrasonic acoustic signals emitted in these directions my encounter users 231-233, respectively, and cause reflected acoustic signals to be propagated back toward the respective sensor units 220. However, ultrasonic acoustic signals emitted in the directions of lines 263 and 266 may not be reflected back toward the respective sensor units 220, since there are no users or other objects in these directions.

As mentioned above, in one example, the emitted ultrasonic acoustic signals may comprise directional acoustic signals having acoustic energy that is more concentrated in a direction of focus, with attenuated side lobes having a lesser acoustic energy. However, it should be noted that reflected acoustic signals may have a more uniform spatial distribution of acoustic energy as compared to the emitted ultrasonic acoustic signals, e.g., due to irregular shaped surfaces, movements of the objects (e.g., the users 231-233, respectively) and other scattering in the environment. In one example, the sensor units 220 each may emit an ultrasonic acoustic signal having a different pattern. For example, the ultrasonic acoustic signals may be differentiated by frequency/wavelength. In one example, ultrasonic acoustic signals may be separated by 20-30 Hertz (Hz). Alternatively, or in addition, the ultrasonic acoustic signals may be differentiated by a coded pattern. For instance, the ultrasonic acoustic signals may comprise packets of on-off coded ultrasonic acoustic transmissions, a pattern of comprising a combination of long and short ultrasonic acoustic transmissions, and so forth, where each pattern may be different for a different one of the sensor units 220. In one example, different frequencies/wavelengths and different coding patterns may both be used in conjunction with one another. The separation in frequency combined with the directionality of the emitters/receivers diminishes the likelihood of false readings. Thus, although it is possible to pick up reflected signals from other sensor units 220 in the array sporadically, the likelihood that the ultrasonic receiver of one of the sensor units 220 will continuously receive scattering signals from the other sensor units 220 is low. In one example, the ultrasonic detector of each of the sensor units 220 may therefore be configured to detect a reflected signal having a pattern corresponding to the pattern of the ultrasonic signal that was transmitted from the ultrasonic emitter of the respective one of the sensor units 220.

In one example, the sensor units 220 may be controlled by integrated microcontrollers (not shown), by processing unit 290, or by integrated microcontrollers and processing unit 290 operating in conjunction with one another. In one example, objects, such as users 231-233, may be detected (e.g., by an integrated microcontroller or by processing unit 290) when a reflected ultrasonic acoustic signal is received by an ultrasonic detector of one of the sensor units 220 (where the reflected ultrasonic acoustic signal corresponds to a transmitted ultrasonic acoustic signal of the one of the sensor units 220). In addition, in one example, a distance between the user 210 and the object may be calculated based upon a time difference between a time when the ultrasonic acoustic signal is transmitted and a time when the reflected ultrasonic acoustic signal is received.

As mentioned above, the ultrasonic detector may be looking for a reflected ultrasonic acoustic signal having a wavelength/frequency corresponding to the ultrasonic acoustic signal that was transmitted. However, the transmitted ultrasonic acoustic signal and/or the reflected ultrasonic acoustic signal may have been subjected to Doppler shifts due to a movement of the user 210 and/or the object off of which the ultrasonic acoustic signal is reflected. Thus, in one example, a Doppler correction may be applied to a received ultrasonic acoustic signal in order to determine whether the received ultrasonic acoustic signal is a reflected ultrasonic acoustic signal that corresponds to the transmitted ultrasonic acoustic signal. Alternatively, or in addition, a range of uncertainty in the received signal may be allowed based upon the speed. For instance, any received signal that is within a certain frequency range that includes the frequency/wavelength of the first ultrasonic signal may be considered to be a reflected signal comprising a reflection of the first ultrasonic signal off of the object. In one example, the Doppler correction may be applied by an integrated microcontroller and/or processor unit 190 based upon a speed measurement from a speed sensor (not shown), and/or an accelerometer (not shown) of the respective one of the sensor units 220.

As illustrated in FIG. 2, there are three users 231-233 behind user 210. The wearable unit 280 may detect each of these other users based upon the receipt of reflected ultrasonic acoustic signals at the sensor units 220. However, in one example, the present disclosure distinguishes between detected objects that may comprise teammates and those detected objects, e.g., other users, who are not teammates. For example, user 210 may comprise a lead cyclist in a pack of cyclists in a race. Users 231 and 232 may comprise teammates of user 210, while user 233 may comprise a competitor. To distinguish between teammates and competitors, in one example, participants may be provided with forward-facing ultrasonic emitters, e.g., forward-facing ultrasonic emitters 241, 242, and 243 for users 231-233, respectively. In one example, forward-facing ultrasonic emitters 241-243 may comprise components of other wearable units that are worn by users 231-233. In one example, the forward-facing ultrasonic emitters 241-243 may emit ultrasonic acoustic signals that are at predetermined frequencies/wavelengths and/or which have other distinguishing patterns such that if an ultrasonic acoustic signal is received from one of the forward-facing ultrasonic emitters 241-243, the source may be determined by the receiving device. For example, one or more of the sensor units 220 of the wearable unit 280 may receive an ultrasonic acoustic signal from the forward-facing ultrasonic emitters 241 (e.g., via an ultrasonic detector). The detection of the ultrasonic acoustic signal from the forward-facing ultrasonic emitters 241 may be notified to the processing unit 290, which may then determine whether the source of the ultrasonic acoustic signal is a teammate or non-teammate by comparing the pattern of the ultrasonic acoustic signal to a known pattern or patterns for the team or for one or more particular teammates of the user 210.

To illustrate, user 231 may first be detected as an unknown object via one or both of the sensor units 220 oriented along lines 261 and 262. However, one or both of the sensor units 220 oriented along lines 261 and 262 may also receive the ultrasonic acoustic signal from forward-facing ultrasonic emitter 241, whereupon the processing unit 290 may determine that the ultrasonic acoustic signal from forward-facing ultrasonic emitter 241 is associated with a teammate, user 231. In other words, since the signal from forward-facing ultrasonic emitter 241 is determined to be associated with the teammate, user 231, and is received via one or both of the same sensor units 220 oriented along lines 261 and 262 via which the unknown object was detected, it may be concluded that the unknown object is the teammate, user 231. In a similar manner, it may be determined that an unknown object detected via one or both of the sensor units 220 oriented along lines 264 and 265 comprises another teammate, user 232, based upon an ultrasonic acoustic signal transmitted by forward-facing ultrasonic emitter 242 and received by one or both of the same sensor units 220 oriented along lines 264 and 265. However, user 233 may be determined to be a competitor when user 233 is detected as an unknown object via one or both of the sensor units 220 oriented along lines 267 and 268 and when the ultrasonic acoustic signal emitted via forward-facing ultrasonic emitter 243 is either not received, or is received via one or both of the sensor units 220 oriented along lines 267 and 268 and is determined to not match a known pattern of the team and/or a teammate of user 210.

In one example, one or more haptic signals may be provided to user 210 based upon the detection(s) of objects behind user 210, e.g., users 231-233. For instance, each of the sensor units 220 may include a haptic actuator (not shown) for providing a haptic signal to the user 210. In one example, haptic signals may be specifically disabled for detections of objects that are determined to be teammates of the user 210. However, in another example, haptic signals having different patterns may be used to distinguish between detected objects that are determined to be teammates of the user and those objects that are not. For example, steady on-off pulses may be used for a haptic signal to indicate a detected object that is not determined to be a teammate of the user 210, while alternating short and long pulses may be used to identify a detected object that is determined to be a teammate of the user 210.

In one example, when an object is detected via one of the sensor units 220, a haptic signal may be provided via the same one of the sensor units 220, where the haptic signal corresponds to the object that is detected. For instance, in one example, a pattern of the haptic signal may be based upon a distance to the object that is determined (determining a distance to a detected object is described above). For example, the haptic signal may comprise a sequence of pulses, where a time between pulses may be shorter, the closer the detected object, and may be longer, the further away the detected object. In another example, the intensity of the haptic signal, e.g., an amplitude and/or a force of a pulse generated by the haptic actuator may be increased when the objected is detected at a closer distance, as compared to when the object is detected further away. To illustrate, in one example, haptic signaling may be disabled, or no haptic signaling may be provided for detected objects that are determined to be teammates of user 210. Thus, in the example of FIG. 2, no haptic signaling may be associated with the detection of users 231 and 232. However, since user 233 may be detected (e.g., via the sensor units 220 oriented along lines 267 and 268) and since it may be determined that user 233 is not a teammate of the user, haptic signaling may be generated at the sensor units 220 oriented along lines 267 and 268. For instance, pluses may be provided against the user 210 at these sensor units 220, which may inform the user 210 that there is a competitor that has been detected in the direction of lines 267 and 268. In addition, the pattern(s) of the haptic signal(s) may also indicate to the user 210 a calculated distance between the user 210 and the user 233.

Figure 3:
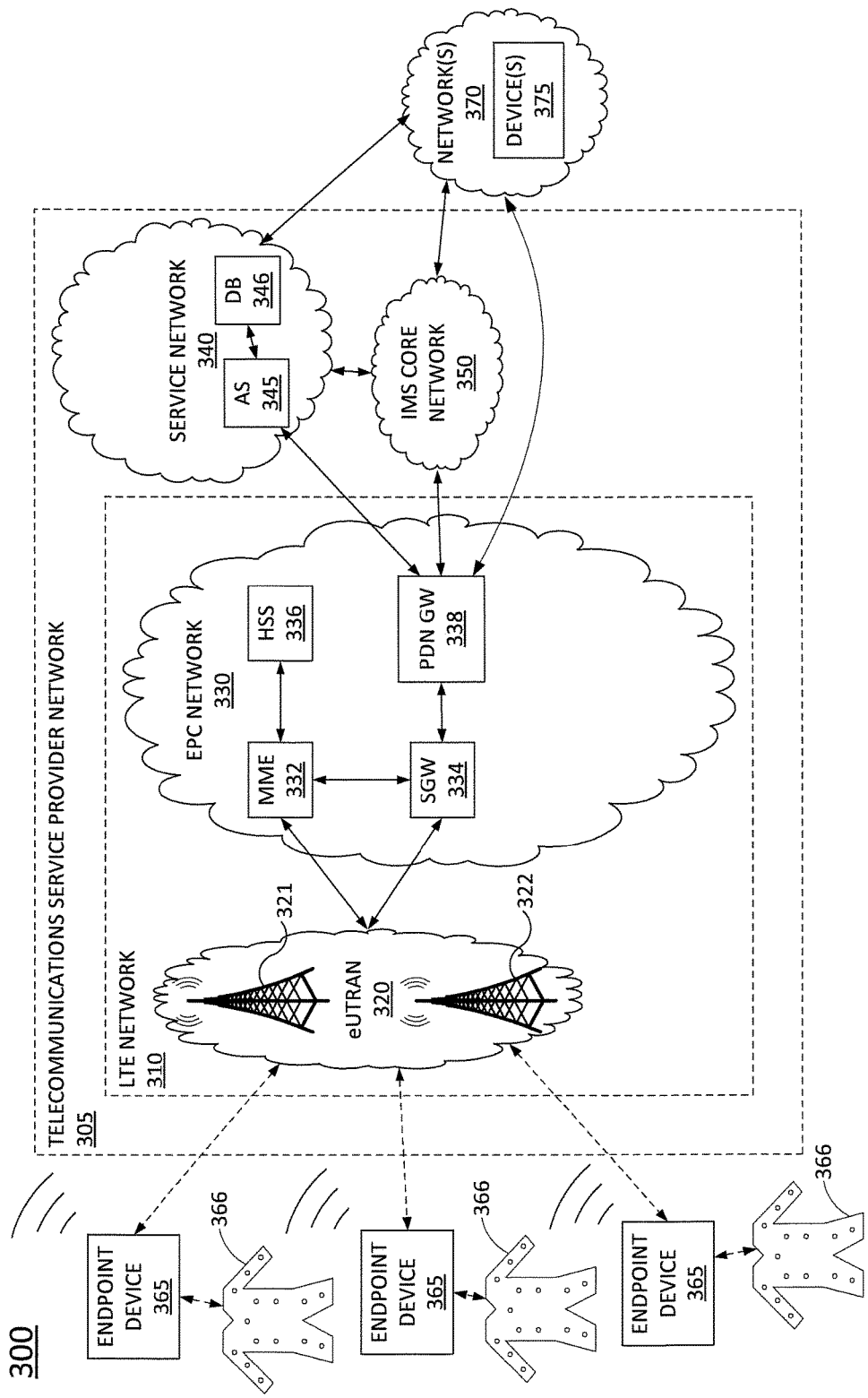
FIG. 3 illustrates an example system related to the present disclosure.

FIG. 3 illustrates an example network, or system 300 that may implement or support embodiments of the present disclosure for providing a haptic signal based upon a detection of an object. In one example, the system 300 includes a telecommunications service provider network 305. The telecommunications service provider network 305 may comprise a Long Term Evolution (LTE) network 310, a service network 340, and a core network, e.g., an IP Multimedia Subsystem (IMS) core network 350. The system 300 may further include other networks 370 connected to the telecommunications service provider network 305. As shown in FIG. 3, the system 300 may connect endpoint devices 365 with devices 375 in networks 370, with other endpoint devices (not shown) and/or with other components of telecommunication service provider network 305. The endpoint devices 365 may each comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device").

In one example, endpoint devices 365 may be in communication with respective wearable units 366. For instance, there may be three different users, each with a respective one of the endpoint devices 365 and a respective one of the wearable units 366. In one example, the users may be team members who are participating in a sporting event. In one example, the wearable units 366 may have a same or a similar form as wearable unit 100 in FIG. 1 and/or wearable unit 280 of FIG. 2. In one example, endpoint devices 365 may each include a wireless transceiver for IEEE 802.11 based communications, IEEE 802.15 based communications, or the like, where the wearable units 366 may be similarly equipped. Alternatively, or in addition, the endpoint devices 365 may connect to the wearable units 366 via one or more wired connections. In one example, each of the wearable units 366 may also include or be connected to a speed sensor, such as a GPS or tachometer, not shown. As described in greater detail below, the wearable units 366 may be configured for operation via network connections of endpoint devices 365 to a network-based server. Collectively, the wearable units 366 may comprise a system for providing a haptic signal based upon a detection of an object, in accordance with the present disclosure.

In one example, the LTE network 310 comprises an access network and a core network. For example, as illustrated in FIG. 3, LTE network 310 may comprise an evolved Universal Terrestrial Radio Access Network (eUTRAN) 320 and an evolved packet core (EPC) network 330. The eUTRANs are the air interfaces of the $3^{rd}$ Generation Partnership Project (3GPP) LTE specifications for mobile networks. In one example, EPC network 330 provides various functions that support wireless services in the LTE environment. In one example, EPC network 330 is an Internet Protocol (IP) packet core network that supports both real-time and non-real-time service delivery across a LTE network, e.g., as specified by the 3GPP standards. In one example, all eNodeBs, e.g., including eNodeBs 321 and 322 in the eUTRAN 320, are in communication with the EPC network 330. In operation, LTE user equipment or user endpoints (UE), such as endpoint devices 365, may access wireless services via the eNodeBs 321 and 322 located in eUTRAN 320. It should be noted that any number of eNodeBs can be deployed in an eUTRAN.

In EPC network 330, network devices Mobility Management Entity (MME) 332 and Serving Gateway (SGW) 334 support various functions as part of the LTE network 310. For example, MME 332 is the control node for the LTE access networks, e.g., including eUTRAN 320. In one embodiment, MME 332 is responsible for user equipment tracking and paging (e.g., such as retransmissions), bearer activation and deactivation process, selection of the SGW, e.g., SGW 334, and user authentication. In one embodiment, SGW 334 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 330 may comprise a Home Subscriber Server (HSS) 336 that contains subscription-related information (e.g., subscriber profiles), performs authentication and authorization of a wireless service user, and provides information about the subscriber's location. The EPC network 330 may also comprise a packet data network (PDN) gateway 338 which serves as a gateway that provides access between the EPC network 330 and various data networks, e.g., service network 340, IMS core network 350, networks 370, and the like. The packet data network gateway 338 is also referred to as a PDN gateway, a PDN GW or a PGW.

In one example, service network 340 may comprise one or more devices for providing services to subscribers, customers, and or users. For example, telecommunications service provider network 305 may provide a cloud storage service, web server hosting, and other services. As such, service network 340 may represent aspects of telecommunications service provider network 305 where infrastructure for supporting such services may be deployed. In the example of FIG. 3, service network 340 may include an application server (AS) 345. In one example, AS 345 may comprise a computing system, such as computing system 500 depicted in FIG. 5, specifically configured to perform various steps, functions, and/or operations in support of systems for providing a haptic signal based upon a detection of an object, in accordance with the present disclosure. In one example, service network 340 may also include a database (DB) 346, e.g., a physical storage device integrated with AS 345 (e.g., a database server), or attached or coupled to the AS 345, to store various types of information in support of systems for providing a haptic signal based upon a detection of an object, in accordance with the present disclosure.

In one example, networks 370 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 370 may include different types of networks. In another example, the other networks 370 may be the same type of network. Devices 375 may include personal computers, desktop computers, laptop computers, personal digital assistants (PDAs), tablet computing devices, circuit-switched or packet communications-based telephones, or any other wireless and/or wired communication enabled computing device. In one example, endpoint devices 365 may be connected to one of devices 375 via PDN GW 338, and/or via PDN GW 338 and IMS core network 350. In one example, one or more of devices 375 may comprise a computing system, such as computing system 500 depicted in FIG. 5, specifically configured to perform various steps, functions, and/or operations in support of systems for providing a haptic signal based upon a detection of an object, in accordance with the present disclosure. In this regard, it should be noted that various functions are described below that may be performed by AS 345. However, it should be appreciated that in another example, such functions may alternatively be performed by one or more of devices 375.

In one example, AS 345 may comprise a server to coordinate wearable units 366 for teammates and to provide configuration parameters for the wearable units 366. For instance, users (e.g., teammates) may connect to AS 345 via respective endpoint devices 365 to register the wearable units 366 and to associate the wearable units 366 with one another. For instance, AS 345 may provide a website for the users to login via the respective endpoint devices 365 and be presented with a menu to select a team or to input a team identifier. AS 345 may further request that the users input an identifier of the respective wearable units 366, such as a serial number or the like. Alternatively, or in addition, AS 345 may simply manage the wearable units 366 based upon the respective endpoint devices 365 via which the users log in. Based upon the selection of a same team by the users of endpoint devices 365, AS 345 may determine that wearable units 366 are to be associated with one another. AS 345 may then select and assign different configuration parameters, such as different ultrasonic acoustic patterns for each of the wearable units 366 to use during the sporting event. For instance, a first of the wearable units 366 may be given a first frequency and/or another encoding/pattern/characteristic for a first forward-facing ultrasonic emitter to use to uniquely identify a first user, a second of the wearable units 366 may be given a second frequency and/or another encoding/pattern/characteristic for a second forward-facing ultrasonic emitter to uniquely identify a second user, and so on. AS 345 may similarly assign frequencies and/or other encodings/patterns/characteristics for ultrasonic emitters of sensor units of the various wearable units 366. AS 345 may send communications to the respective endpoint devices 365 informing of the configuration parameters to be used by the respective wearable units 366. Notably, AS 345 may inform each of the endpoint devices 365 of the patterns to be used for the various ultrasonic signals to be transmitted by the one of the wearable units 366 associated with respective one of the endpoint devices as well as the patterns to be used for the ultrasonic signals of forward-facing emitters of the wearable units 366 associated with other teammates. Endpoint devices 365 may then load the configuration parameters into the respective wearable units 366. As such, wearable units 366 may be deployed and may be configured to detect one another and to identify each other as teammates during the course of the event. Notably, wearable units 366 may function as a system for providing a haptic signal based upon a detection of an object without the involvement of the endpoint devices 365 during the course of the event.

It should be noted that the system 300 has been simplified. In other words, the system 300 may be implemented in a different form than that illustrated in FIG. 3. For example, the system 300 may be expanded to include additional networks, such as network operations center (NOC) networks, additional eUTRANs, and so forth. The system 300 may also be expanded to include additional network elements such as border elements, routers, switches, policy servers, security devices, gateways, a content distribution network (CDN) and the like, without altering the scope of the present disclosure. In addition, system 300 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 320, EPC network 330, service network 340, and IMS core network 350 are omitted for clarity, including gateways or border elements providing connectivity between such networks, internal routers within EPC network 330, and so on. Similarly, due to the relatively large number of connections available between devices in the system 300, various links between MME 332, SGW 334, eNodeBs 311 and 312, PDN GW 338, AS 345, and other components of system 300 are also omitted for clarity.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network). In still another example, endpoint devices 365 may be loaded with applications which may collectively coordinate configuration parameters of wearable units 366, e.g., without the involvement of a network-based server, such as AS 345 or one or more of devices 375. In such an example, endpoint devices 365 may communicate with one another using peer-to-peer communications, e.g., by establishing an IEEE 802.11-based and/or 802.15-based ad-hoc wireless network, or by using the telecommunications service provider network 305 simply as a communication medium. Similarly, although the AS 345 and DB 346 are illustrated as components of service network 340, in other examples, any one or more of these components may be deployed in a different configuration. Thus, these and other modifications are all contemplated within the scope of the present disclosure.

Figure 4:
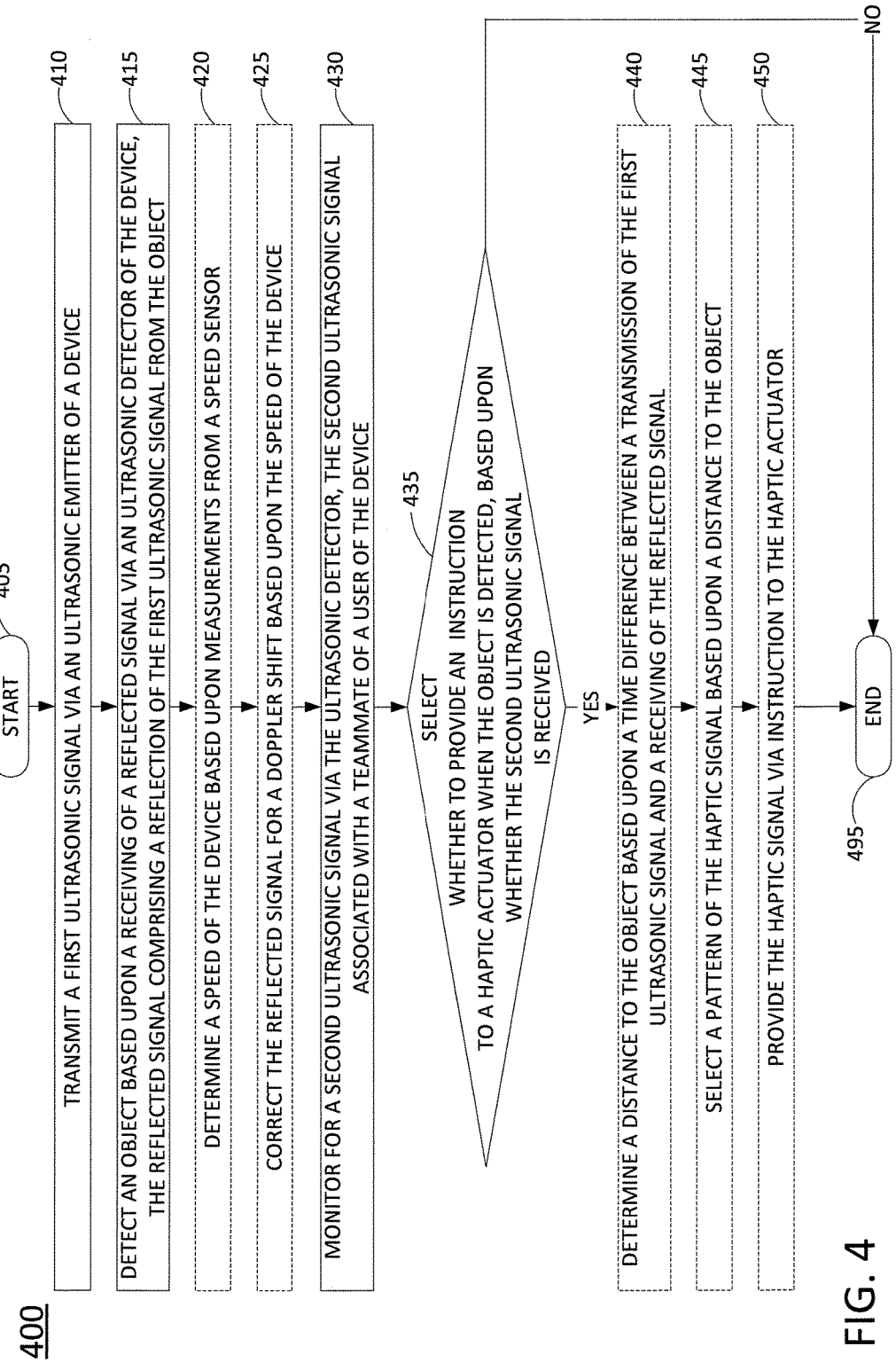
FIG. 4 illustrates a flowchart of an example method for providing a haptic signal based upon a detection of an object.

FIG. 4 illustrates a flowchart of an example method 400 for providing a haptic signal based upon a detection of an object, in accordance with the present disclosure. In one example, steps, functions and/or operations of the method 400 may be performed by a microprocessor of a sensor unit, or by a processor unit of a wearable device. In one example, the steps, functions, or operations of method 400 may be performed by a computing device or system 500, and/or processor 502 as described in connection with FIG. 5 below. For instance, computing device or system 500 may represent a microprocessor of a sensor unit, or a processor unit of a wearable device of the present disclosure. For illustrative purposes, the method 400 is described in greater detail below in connection with an example performed by a processor, such as processor 502. The method 400 begins in step 405 and proceeds to step 410.

At step 410, the processor transmits a first ultrasonic signal via an ultrasonic emitter of a device of a user, e.g., a wearable unit and/or a sensor unit of the wearable unit. In one example, the ultrasonic emitter may comprise an acoustic array, such as a parametric array which may be comprised of capacitive ultrasonic transducers, piezo-electric/piezo-resistive ultrasonic transducers, or the like. In one example, the ultrasonic emitter may be oriented away from a user's blindside for purposes of detecting objects and risks which the user may not see. In one example, the first ultrasonic signal comprises a directional ultrasonic wave, e.g., a wave that is focused in a given direction, with side lobes having lesser intensities as compared to the direction of focus. The first ultrasonic signal may have a first frequency/wavelength and/or one or more additional defining characteristics, such as a coded pattern, e.g., on-off coded ultrasonic acoustic transmissions, a pattern comprising a combination of long and short ultrasonic acoustic transmissions, or the like.

At step 415, the processor detects and object based upon a receiving of a reflected signal via an ultrasonic detector. In one example, the ultrasonic detector may comprise the same or similar components as the ultrasonic emitter. In one example, the reflected signal comprises a reflection of the first ultrasonic signal from the object. Following step 415, the method 400 may proceed to optional step 420 or to step 430.

At optional step 420, the processor determines a speed of the device based upon measurements from a speed sensor. The speed sensor may comprise, for example, a GPS integrated with, coupled to, or in communication with the processor and/or the device, or a tachometer, e.g., affixed to a bicycle wheel or the like.

At optional step 425, the processor corrects the reflected signal for a Doppler shift based upon the speed of the device. For instance, the reflected signal may be received at a different frequency/wavelength that the first ultrasonic signal that is transmitted, e.g., due to the relative movements of the device and/or the object. Therefore, the processor may adjust the frequency of the received signal based upon the speed of the device or may allow for a range of uncertainty in the received signal based upon the speed. For instance, any received signal that is within a certain frequency range that includes the frequency/wavelength of the first ultrasonic signal may be considered to be a reflected signal comprising a reflection of the first ultrasonic signal off of the object.

At step 430, the processor monitors for a second ultrasonic signal via the ultrasonic detector. For example, the second ultrasonic signal may be associated with a teammate of the user of the device that includes the processor, the ultrasonic emitter and the ultrasonic detector. In one example, the processor may have access to a record of one or more patterns for ultrasonic signals that are associated with teammates of the user. Thus, at step 430, the processor may compare a pattern of the second ultrasonic signal that is received with a known pattern or patterns of one or more teammates. When there is a match, the processor may determine that the object that is detected comprises a teammate of the user.

At step 435, the processor selects whether to provide an instruction to a haptic actuator when the object is detected, based upon whether the second ultrasonic signal is received via the ultrasonic detector. For example, when the object is detected and the second ultrasonic signal is received, the selecting may comprise either: selecting to provide the instruction to the haptic actuator, where the instruction comprises an instruction to generate a first pattern for a haptic signal, or determining to not send an instruction to the haptic actuator. To illustrate, the first pattern for the haptic signal may be used to indicate a detection of the object and that the object is the teammate of the user. However, in another example, the processor may be configured to suppress notifications of object detections via haptic signaling when the object is determined to be a teammate of the user. In one example, when the object is detected and the second ultrasonic signal is not received, the selecting comprises selecting to provide the instruction to the haptic actuator, where the instruction comprises an instruction to generate a second pattern for the haptic signal. For instance, the second pattern for the haptic signal may be used to indicate of a detection of the object and that the object is not the teammate of the user.

Following step 435, the method 400 may proceed to optional step 440 or optional step 450, or to step 495. For instance, if the processor selected to not provide the instruction to the haptic actuator, the method 400 may proceed to step 495. Otherwise, the method 400 may proceed to optional step 440 or optional step 450.

At optional step 440, the processor may determine a distance to the object based upon a time difference between a transmission of the first ultrasonic signal via the ultrasonic emitter and a receiving of the reflected signal via the ultrasonic detector. For instance, step 440 may comprise multiplying the speed of sound in air (or water, e.g., in the case of an open-water swimming event, or the like) by one half of the time difference to determine the distance to the object.

At optional step 445, the processor may select a pattern of the haptic signal based upon a distance to the object. In one example, the pattern selected at optional step 445 may be as an alternative to or in addition to any pattern that may be selected at step 435. For instance, if at step 435 it is determined to send an instruction to the haptic actuator, as part of step 435 the processor may further select an intensity or force for the haptic signal to be provided, while at optional step 445, the processor may further determine to set a frequency of pulses based upon the distance. In another example, the processor may, at step 435 select a frequency of pulses, e.g., based upon whether the object is a teammate or a non-teammate, while at optional step 445, the processor may select an intensity or force of the pulses based upon the distance that is determined.

At optional step 450, the processor may provide the haptic signal via the instruction to the haptic actuator. Following optional step 450, the method 400 proceeds to step 495. At step 495, the method 400 ends.

It should be noted that the example of FIG. 4 is described primarily in connection with the transmission of a first ultrasonic signal, the receiving of a reflected signal, the monitoring for a second ultrasonic signal, and the selection of whether to provide an instruction to a haptic actuator within the context of one sensor unit of a wearable device. However, as described above, a wearable unit may comprise a plurality of sensor units having different orientations. Thus, in one example, the method 400 may be performed in parallel, e.g., by a plurality of microprocessors of a plurality of sensor units, or by a centralized processor unit that is multitasking a plurality of performances of the method 400 with respect to a plurality of different sensor units. In one example, this may result in the providing of at least two haptic signals via haptic actuators of at least two of the plurality of sensor units, where the at least two haptic signals indicate a direction of a single object, or several different objects (e.g., teammates or non-teammates), in relation to a user of the device.

In addition, it should be noted that although not specifically specified, one or more steps, functions or operations of the method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation or involve a decision do not necessarily require that both branches of the determining operation be practiced. In other words, one of the branches of the determining operation can be deemed as an optional step. It should be noted that the method 400 may be expanded to include additional steps. In addition, one or more steps, blocks, functions, or operations of the above described method 400 may comprise optional steps, or can be combined, separated, and/or performed in a different order from that described above, without departing from the example embodiments of the present disclosure.

Figure 5:
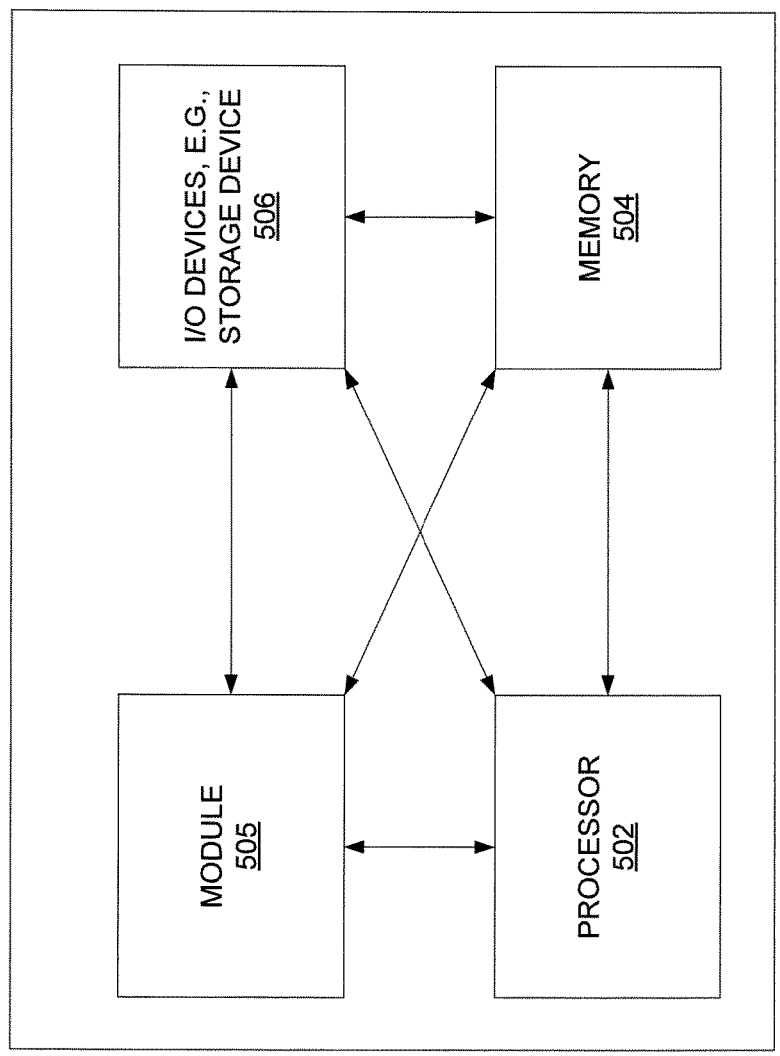
FIG. 5 illustrates an example high-level block diagram of a computing device specifically programmed to perform the steps, functions, blocks, and/or operations described herein.

FIG. 5 depicts a high-level block diagram of a computing device specifically programmed to perform the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for providing a haptic signal based upon a detection of an object, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one embodiment, instructions and data for the present module or process 505 for providing a haptic signal based upon a detection of an object (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for providing a haptic signal based upon a detection of an object (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a first ultrasonic emitter to transmit a first ultrasonic signal;
   an ultrasonic detector to receive a reflected signal, the reflected signal comprising a reflection of the first ultrasonic signal from an object;
   a processor to perform operations comprising:
   detecting the object based upon a receiving of the reflected signal via the ultrasonic detector;
   monitoring for a second ultrasonic signal via the ultrasonic detector wherein the device is associated with a user, and wherein the second ultrasonic signal comprises an emitted signal received from a second ultrasonic emitter associated with a teammate of the user; and
   selecting whether to provide an instruction to a haptic actuator when the object is detected, based upon whether the second ultrasonic signal is received via the ultrasonic detector, wherein the selecting comprises:
   when the object is detected and in response to the second ultrasonic signal being received: providing the instruction to the haptic actuator, wherein the instruction comprises an instruction to generate a first pattern for a haptic signal, or determining to not send the instruction to the haptic actuator; and
   when the object is detected and in response to the second ultrasonic signal not being received within a time period: providing the instruction to the haptic actuator, wherein the instruction comprises an instruction to generate a second pattern for the haptic signal; and
   the haptic actuator to generate the first pattern or the second pattern for the haptic signal based upon whether the instruction is provided from the processor.

2. The device of claim 1, wherein the first pattern for the haptic signal is indicative of a detection of the object and is indicative that the object is the teammate of the user.

3. The device of claim 1, wherein the second pattern for the haptic signal is indicative of a detection of the object and is indicative that the object is not the teammate of the user.

4. The device of claim 1, wherein the first ultrasonic emitter comprises a capacitive ultrasonic transducer.

5. The device of claim 4, wherein the first ultrasonic emitter comprises a parametric array.

6. The device of claim 1, wherein the ultrasonic detector is aligned with the first ultrasonic emitter, and wherein the first ultrasonic signal comprises a directional ultrasonic wave that is focused in a given direction, with side lobes having lesser intensities as compared to the given direction.

7. The device of claim 1, further comprising:
   a speed sensor, wherein the speed sensor comprises:
   a global positioning system unit; or
   a tachometer;
   wherein the processor is to perform further operations, comprising:
   determining a speed of the device based upon measurements from the speed sensor; and
   correcting the reflected signal for a Doppler shift based upon the speed of the device.

8. The device of claim 1, wherein the processor is to perform further operations comprising:
   determining a distance to the object based upon a time difference between a transmission of the first ultrasonic signal via the first ultrasonic emitter and a receiving of the reflected signal via the ultrasonic detector; and
   adjusting the first pattern for the haptic signal or the second pattern for the haptic signal based upon the distance to the object that is determined.

9. The device of claim 1, wherein the first ultrasonic signal comprises a first frequency, and wherein the second ultrasonic signal comprises a second frequency that is different from the first frequency.

10. The device of claim 1, wherein the device comprises a wearable unit, and wherein the first ultrasonic emitter and the ultrasonic detector are oriented in a direction behind the user when the wearable unit is worn by the user.

11. The device of claim 10, wherein the wearable unit comprises:
    a vest;
    a shirt;
    a helmet;
    a pair of pants; or
    a pair of shorts.

12. The device of claim 1, wherein the first ultrasonic emitter, the ultrasonic detector, and the haptic actuator comprise a first sensor unit, wherein the first sensor unit comprises one of a plurality of sensor units of the device, wherein the plurality of sensor units has different orientations.

13. A non-transitory computer-readable medium storing instructions which, when executed by a processor, cause the processor to perform operations, the operations comprising:

transmitting a first ultrasonic signal via a first ultrasonic emitter;

detecting an object based upon a receiving of a reflected signal via an ultrasonic detector, wherein the reflected signal comprises a reflection of the first ultrasonic signal from the object;

monitoring for a second ultrasonic signal via the ultrasonic detector, wherein the processor is associated with a user, and wherein the second ultrasonic signal comprises an emitted signal received from a second ultrasonic emitter associated with a teammate of the user; and selecting whether to provide an instruction to a haptic actuator when the object is detected, based upon whether the second ultrasonic signal is received via the ultrasonic detector, wherein the selecting comprises:

when the object is detected and in response to the second ultrasonic signal being received: providing the instruction to the haptic actuator, wherein the instruction comprises an instruction to generate a first pattern for a haptic signal, or determining to not send the instruction to the haptic actuator; and when the object is detected and in response to the second ultrasonic signal not being received within a time period: providing the instruction to the haptic actuator, wherein the instruction comprises an instruction to generate a second pattern for the haptic signal.

14. A device comprising:

a processor; and a computer-readable medium storing instructions which, when executed by the processor, cause the processor to perform operations, the operations comprising:

transmitting a first ultrasonic signal via a first ultrasonic emitter;

detecting an object based upon a receiving of a reflected signal via an ultrasonic detector, wherein the reflected signal comprises a reflection of the first ultrasonic signal from the object;

monitoring for a second ultrasonic signal via the ultrasonic detector, wherein the device is associated with a user, and wherein the second ultrasonic signal comprises an emitted signal received from a second ultrasonic emitter associated with a teammate of the user; and selecting whether to provide an instruction to a haptic actuator when the object is detected, based upon whether the second ultrasonic signal is received via the ultrasonic detector, wherein the selecting comprises:

when the object is detected and in response to the second ultrasonic signal being received: providing the instruction to the haptic actuator, wherein the instruction comprises an instruction to generate a first pattern for a haptic signal, or determining to not send the instruction to the haptic actuator; and when the object is detected and in response to the second ultrasonic signal not being received within a time period: providing the instruction to the haptic actuator, wherein the instruction comprises an instruction to generate a second pattern for the haptic signal.

15. The device of claim 14, wherein the first pattern for the haptic signal is indicative of a detection of the object and is indicative that the object is the teammate of the user.

16. The device of claim 14, wherein the second pattern for the haptic signal is indicative of a detection of the object and is indicative that the object is not the teammate of the user.

17. The device of claim 14, wherein the operations further comprise:

determining a distance to the object based upon a time difference between a transmission of the first ultrasonic signal via the first ultrasonic emitter and a receiving of the reflected signal via the ultrasonic detector; and adjusting the first pattern for the haptic signal or the second pattern for the haptic signal based upon the distance to the object that is determined.

18. The device of claim 14, wherein the first ultrasonic signal comprises a first frequency, and wherein the second ultrasonic signal comprises a second frequency that is different from the first frequency.

19. The device of claim 14, wherein the device comprises a wearable unit.

20. The device of claim 19, wherein the wearable unit comprises:

a vest;
a shirt;
a helmet;
a pair of pants; or
a pair of shorts.

* * * * *